(12) United States Patent
Hwang et al.

(10) Patent No.: US 10,538,155 B2
(45) Date of Patent: Jan. 21, 2020

(54) POWER TRANSMISSION APPARATUS FOR VEHICLE

(71) Applicants: HYUNDAI MOTOR COMPANY, Seoul (KR); KIA MOTORS CORPORATION, Seoul (KR)

(72) Inventors: Seong Wook Hwang, Gunpo-si (KR); Hyun Sik Kwon, Seoul (KR); Ki Tae Kim, Incheon (KR); Wonmin Cho, Hwaseong-si (KR); Jae Chang Kook, Hwaseong-si (KR); Seongwook Ji, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 139 days.

(21) Appl. No.: 15/835,364

(22) Filed: Dec. 7, 2017

(65) Prior Publication Data

US 2019/0126735 A1 May 2, 2019

(30) Foreign Application Priority Data

Nov. 1, 2017 (KR) .......................... 10-2017-0144495

(51) Int. Cl.
*F16H 3/08* (2006.01)
*B60K 6/365* (2007.10)
(Continued)

(52) U.S. Cl.
CPC ................ *B60K 6/365* (2013.01); *B60K 6/48* (2013.01); *F16H 3/006* (2013.01); *F16H 3/089* (2013.01); *F16H 3/54* (2013.01); *F16H 37/046* (2013.01); *B60K 2006/4825* (2013.01); *B60Y 2200/92* (2013.01); *F16H 2200/0047* (2013.01);
(Continued)

(58) Field of Classification Search
CPC ....... F16H 3/093; F16H 3/006; F16H 37/0833
See application file for complete search history.

(56) References Cited

U.S. PATENT DOCUMENTS 4,132,133 A * 1/1979 Ballendux ................. F16H 3/02
74/745
7,163,483 B2 * 1/2007 Haka .................. B60K 17/3467
180/241

(Continued)

FOREIGN PATENT DOCUMENTS

KR 10-2005-0042671 A 5/2005

*Primary Examiner* — Derek D Knight
(74) *Attorney, Agent, or Firm* — Knobbe Martens Olson & Bear LLP

(57) ABSTRACT

A power transmission apparatus for a vehicle is disclosed. The power transmission apparatus includes a first input shaft selectively connected to an engine output shaft through a first clutch, a second input shaft configured as a hollow shaft that is disposed on the outer circumference of the first output shaft without rotational interference and selectively connected to the engine output shaft through a second clutch, a third input shaft configured as a hollow shaft that is disposed on the outer circumference of the second output shaft without rotational interference and selectively connected to the engine output shaft through a third clutch. The transmission apparatus further comprises an output shaft placed parallel to the first, second, and third input shafts at a certain distance.

8 Claims, 6 Drawing Sheets

(51) Int. Cl.
*F16H 37/04* (2006.01)
*F16H 3/089* (2006.01)
*F16H 3/00* (2006.01)
*B60K 6/48* (2007.10)
*F16H 3/54* (2006.01)

(52) U.S. Cl.
CPC ............... *F16H 2200/0086* (2013.01); *F16H 2200/2005* (2013.01); *F16H 2200/2033* (2013.01); *Y10S 903/91* (2013.01)

(56) References Cited

U.S. PATENT DOCUMENTS

| | | | | |
|---|---|---|---|---|
| 7,311,630 | B2 * | 12/2007 | Borgerson | F16H 37/0833 475/201 |
| 7,695,390 | B2 * | 4/2010 | Phillips | F16H 37/0833 475/218 |
| 8,747,274 | B2 * | 6/2014 | Phillips | F16H 3/78 475/207 |
| 8,857,284 | B2 * | 10/2014 | Kahl | F16H 3/006 74/330 |
| 9,145,960 | B2 * | 9/2015 | Phillips | F16H 3/006 |
| 9,382,975 | B2 * | 7/2016 | Robinette | F16H 3/093 |
| 2014/0128212 | A1 * | 5/2014 | Phillips | F16H 3/78 475/329 |

* cited by examiner

FIG. 2

| Driving mode | Gear | CL1 | CL2 | CL3 | CL4 | MG |
|---|---|---|---|---|---|---|
| Engine mode / Parallel mode | D1 | ● | | | ● | ☐ |
| | D2 | | ● | | ● | ☐ |
| | D3 | | | ● | ● | ☐ |
| | D4 | | ● | ● | | ☐ |
| | D5 | ● | | ● | | ☐ |
| EV mode | REV | | | | ● | ■ (Reverse) |
| | EV1 | | | | ● | ■ |
| E-CVT mode | | | | ● | | ■ |

● : Clutch is operated
■ : Only motor is driven(EV)
☐ : Torque assist driving

FIG. 6

| Driving mode | Gear | CL1 | CL2 | CL3 | CL4 | BK | MG |
|---|---|---|---|---|---|---|---|
| Engine mode / Parallel mode | REV2 | | ● | | | ● | □ |
| | REV1 | ● | | | | ● | □ |
| | D1 | ● | | | ● | | □ |
| | D2 | | ● | | ● | | □ |
| | D3 | | | ● | ● | | □ |
| | D4 | | ● | ● | | | □ |
| | D5 | ● | | ● | | | □ |
| EV mode | EV-REV2 | | | | | ● | ■ |
| | EV-REV1 | | | | ● | | ■ (Reverse) |
| | EV1 | | | | ● | | ■ |
| | EV2 | | | | | ● | ■ (Reverse) |
| E-CVT mode | | | | ● | | | ■ |

● : Clutch is operated
■ : Only motor is driven(EV)
□ : Torque assist driving

POWER TRANSMISSION APPARATUS FOR VEHICLE

CROSS-REFERENCE TO RELATED APPLICATION

This application claims priority to and the benefit of Korean Patent Application No. 10-2017-0144495 filed in the Korean Intellectual Property Office on Nov. 1, 2017, the entire contents of which are incorporated herein by reference.

BACKGROUND

(a) Field

The present disclosure relates to a power transmission apparatus for a vehicle, and more particularly, to a power transmission apparatus for a vehicle that implements fixed gear positions of five speeds forward without a synchronizer and enables driving in parallel mode, electric vehicle mode, and electronic continuously variable transmission mode by using an auxiliary power source.

(b) Related Art

As environmentally-friendly technologies for vehicles are the core technologies which the survival in the future automotive industry relies upon, automakers are investing all their efforts to develop environmentally-friendly automobiles that comply with environmental and fuel economy regulations.

Examples of the future automotive industry include electric vehicles (EVs) using electrical energy, hybrid electric vehicles (HEVs), and dual clutch transmissions (DCTs) offering better efficiency and easier operation.

Because of many technical restrictions on these future cars, like weight and cost, automakers are paying attention to hybrid electric vehicles as an alternative solution to realistic issues, like complying with exhaust emission regulations and improving fuel economy performance, and are fiercely competing with each other to put them into practical use.

A hybrid electric vehicle is a vehicle that uses two or more power sources, which may come in various combinations and uses, as the power sources, a traditional gasoline engine or diesel engine powered with fossil fuels and a motor/generator running on electrical energy in combination.

The above information disclosed in this Background section is only for enhancement of understanding of background of the invention. The disclosure of this section is to provide background of the invention. Applicant notes that this section may contain information available before this application. However, by providing this section, Applicant does not admit that any information contained in this section constitutes prior art.

SUMMARY

In a hybrid electric vehicle, a motor/generator which provides better low-speed torque is used as the main power source at low speeds, and an engine which provides better high-speed torque is used as the main power source at high speeds.

Accordingly, the hybrid electric vehicle can greatly improve fuel economy and reduce emissions by shutting down the engine powered by fossil fuels in low-speed areas and using the motor/generator.

Also, an example of transmission that can be applied to the above hybrid electric vehicle includes a dual clutch transmission. The DCT can increase efficiency and allow easier operation by using two clutches in a manual transmission.

That is, the DCT is a transmission in which two clutches operate alternately, one driving odd gears and the other driving even gears, to thereby accomplish shifts. This mechanism for driving the odd gears and the even gears alternately to execute gear changes can reduce the loss of torque during gear shifts which occurs in traditional MTs (manual transmissions) and AMTs (automated-manual transmissions).

In the DCT, however, the clutches may slip when starting, causing a clutch burnout and high energy loss, and the vehicle may roll backwards too much due to a clutch slip when starting on a hill, which can cause a safety problem. Moreover, the DCT has larger shift-shock in comparison with automated transmissions because its shift times should be kept down due to the heat capacity of the clutches.

In addition, the DCT requires an effective layout of the motor/generator, i.e., an electrical power source, for use in hybrid electric vehicles.

The present disclosure has been made in an effort to provide a power transmission apparatus for a vehicle that implements fixed gears of five speeds forward without a synchronizer and enables driving in parallel mode, electric vehicle mode, and electronic continuously variable transmission mode by using an auxiliary power source, thereby improving fuel economy and acceleration performance.

One or a plurality of embodiments of the present invention provides a power transmission apparatus for a vehicle including: a first input shaft selectively connected to an engine output shaft through a first clutch; a second input shaft configured as a hollow shaft that is disposed on the outer circumference of the first output shaft without rotational interference and selectively connected to the engine output shaft through a second clutch; a third input shaft configured as a hollow shaft that is disposed on the outer circumference of the second output shaft without rotational interference and selectively connected to the engine output shaft through a third clutch; an output shaft placed parallel to the first, second, and third input shafts at a certain distance; a power transmission shaft configured as a hollow shaft that is disposed on the outer circumference of the output shaft without rotational interference and selectively connected to the output shaft through a clutch; a motor/generator that drives the first input shaft; a planetary gear set disposed on the output shaft and has three rotational elements, one of which being fixedly connected to the power transmission shaft and another being fixedly connected to the output shaft; and three speed gears disposed between the first, second, and third input shafts and the power transmission shaft and the remaining rotational element of the planetary gear set, with drive gears and driven gears externally geared to each other.

A rotor of the motor/generator may be fixedly connected to the first input shaft.

The planetary gear set may be a single-pinion planetary gear set, which includes a sun gear fixedly connected to the power transmission shaft, a planetary carrier fixedly connected to the driven gear of one of the three speed gears, and a ring gear fixedly connected to the output shaft through a power transmission member.

The three speed gears may include: a first speed gear row consisting of a first drive gear fixed to the first input shaft and a first driven gear fixed to the power transmission shaft and externally geared to the first drive gear; a second speed gear row consisting of a second drive gear fixed to the second input shaft and a second driven gear fixed to the power transmission shaft and externally geared to the second drive gear; and a third speed gear row consisting of a third drive gear fixed to the third input shaft and a third driven gear fixed to a planetary carrier of the planetary gear set and externally geared to the third drive gear.

The first speed gear row may be set to a gear ratio for one speed gear shifting, the second speed gear row may be set to a gear ratio for two speed gear shifting, and the third speed gear row may be set to a gear ratio for three speed gear shifting.

The motor/generator may have a motor shaft added thereto, and a motor shaft gear fixed onto the motor shaft may be externally geared to the first drive gear on the first input shaft.

The motor/generator may have a motor shaft added thereto, and a motor shaft gear fixed onto the motor shaft may be externally geared to the power transmission gear fixed onto the first input shaft.

The third input shaft may be selectively connected to a transmission housing through a brake.

A power transmission apparatus according to an embodiment of the present invention can implement fixed gears of five speeds forward, without a synchronizer, by using three speed gears and a planetary gear set. This reduces the number of parts and therefore allows for a simplified internal configuration, makes the overall length as short as possible, and minimizes the weight, thereby improving fuel economy.

Furthermore, a power transmission apparatus according to an embodiment of the present invention enables driving in parallel hybrid mode, forward and reverse driving in electric vehicle mode, and driving in electronic continuously variable transmission mode and therefore improves fuel economy, since torque assist driving using a motor/generator is possible in the fixed gears of five speeds forward by employing three shift gears, a planetary gear set, and the motor/generator, without a synchronizer.

Furthermore, a power transmission apparatus according to an embodiment of the present invention enables engine mode driving and parallel mode driving at five speeds forward and two speeds in reverse so as to improve reverse driving performance by allowing one of three rotational elements in the planetary gear set to be held fixed, and also enables electric vehicle mode driving at two speeds forward and in reverse and electronic continuously variable transmission mode driving, thereby improving fuel economy.

Further, effects that can be obtained or expected from embodiments of the present invention are directly or suggestively described in the following detailed description. That is, various effects expected from embodiments of the present invention will be described in the following detailed description.

BRIEF DESCRIPTION OF THE DRAWINGS

FIG. 2 is a table showing how the power transmission apparatus works according to the first embodiment of the present invention shift gears.

FIG. 6 is a table showing how the power transmission apparatus works according to the fourth embodiment of the present invention shift gears.

DESCRIPTION OF SYMBOLS

CL1,CL2,CL3,CL4 . . . first, second, third, and fourth clutches
D1,D2,D3 . . . first, second, and third drive gears
G1,G2,G3 . . . first, second, and third speed gears
EOS . . . engine output shaft (crankshaft)
IS1,IS2,IS3 . . . first, second, and third input shafts
MG . . . motor/generator
OG . . . output gear
OS . . . output shaft
P1,P2,P3 . . . first, second, and third driven gear
PG . . . planetary gear set
TFM . . . power transmission member
TFS . . . power transmission shaft

DETAILED DESCRIPTION

Embodiments of the present invention will be described more fully hereinafter with reference to the accompanying drawings, in which embodiments of the invention are shown. As those skilled in the art would realize, the described embodiments may be modified in various different ways, all without departing from the spirit or scope of the present invention.

To more clearly describe embodiments of the present invention, parts that are irrelevant to the description may be omitted, and like numerals refer to like or similar constituent elements throughout the specification.

In the following description, dividing names of components into first, second and the like is to divide the names because the names of the components are the same as each other and an order thereof is not particularly limited.

In embodiments, when two members (elements) are fixedly connected with a shaft, the two members move together and rotate about a rotational axis at the same angular speed. In embodiments, when a member is fixedly connected to a transmission housing, the member is fixed to the transmission housing and does not rotate about a rotational axis of the transmission. In embodiments, when two members are fixedly connected each other and when one of the two members is fixedly connected to a transmission housing, the two fixedly connected members are fixed to the transmission housing and do not rotate about a rotational axis of the transmission. In embodiments, the term "fixedly connected" is interchangeable with the term "fixed to".

In embodiments, when two members are "selectively connected", the two members are operable (1) to engage (fixedly connected) each other to move/rotate together for a operation of the transmission or (2) not to engage each other and to move independently for another operation of the transmission. In embodiment, the term "selectively connected" is interchangeable with the term "connect or disconnect". In embodiment, when a member engages with a transmission housing, the member is fixed to the transmission housing, and does not rotate about a rotational axis of a transmission.

Figure 1:
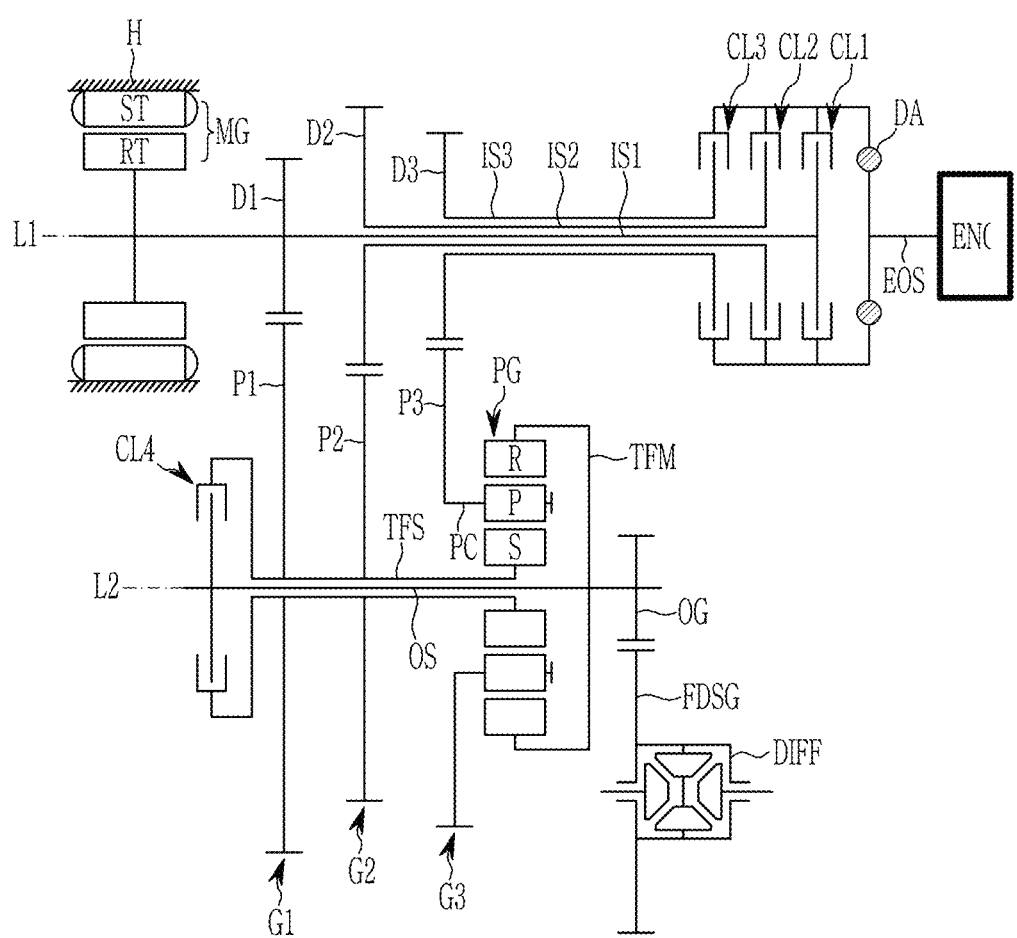
FIG. 1 is a schematic diagram of a power transmission apparatus according to a first embodiment of the present invention.

FIG. 1 is a schematic diagram of a power transmission apparatus according to a first embodiment of the present invention.

Referring to FIG. 1, the power transmission apparatus according to the first embodiment of the present invention includes first, second, and third input shafts IS1, IS2, and IS3 receiving power through three clutches CL1, CL2, and CL3, a fourth clutch CL4 used for synchronization, three speed gears G1, G2, and G3, a planetary gear set PG, a motor/generator MG, a power transmission shaft TFS, and an output shaft OS.

Accordingly, the rotating power of an engine ENG, i.e., a power source, is configured to implement fixed gears of five speeds forward without using a friction synchronizer (for engaging two rotational elements at the same time for a smooth gear change, and causing friction loss) and enables driving in parallel mode, electric vehicle mode, and electronic continuously variable transmission mode by using torque assist.

As the engine ENG, which is a power source, various types of well-known engines such as a traditional gasoline engine or diesel engine powered with fossil fuels may be used.

Each of the above components is disposed on first and second axis lines L1 and L2 which are placed parallel to each other with a certain distance between them.

The first, second, and third input shafts IS1, IS2, and IS3 and the motor/generator MG are disposed on the first axis line L1, and the output shaft OS, the power transmission shaft TFS, and the planetary gear set PG are disposed on the second axis line L2.

The three speed gears G1, G2, and G3 are formed between the first, second, and third input shafts IS1, IS2, and IS3 and the power transmission shaft TFS and planetary gear set PG.

The first input shaft IS1 disposed on the first axis line L1 is selectively connected to an engine output shaft EOS (crankshaft) of the engine ENG through the first clutch CL1. As shown in FIG. 2, for REV1, D1 and D5 gears, the first clutch CL1 is operated to connect the first input shaft IS1 and the an engine output shaft EOS. For the other gears, the first clutch CL1 does not operates and the first input shaft IS1 is disconnected from the an engine output shaft EOS.

The second input shaft IS2 is configured as a hollow shaft that is disposed on the outer circumference of the first output shaft IS1 without rotational interference and selectively connected to the engine output shaft EOS through the second clutch CL2.

The third input shaft IS3 is configured as a hollow shaft that is disposed on the outer circumference of the second output shaft IS2 without rotational interference and selectively connected to the engine output shaft EOS through the third clutch CL3.

In this case, the second input shaft IS2 is exposed a certain length from the third input shaft IS3 to the opposite side of the engine, and the first input shaft IS1 is exposed a certain length from the second input shaft IS2 to the opposite side of the engine.

The motor/generator MG disposed on the first axis line L1 is an electric supplementary drive unit, which performs the motor's function of generating driving torque and the generator's function of generating reaction force and includes a stator ST fixed to a transmission housing H and a rotor RT rotatable inside the stator ST, and the rotor RT is fixedly connected to the first input shaft IS1.

The output shaft OS disposed on the second axis line L2 transmits received rotating power to a final reduction gear FSDG in a differential DIFF through the output gear OG.

The power transmission shaft TFS disposed on the second axis line L2 is configured as a hollow shaft that is disposed on the outer circumference of the output shaft OS without rotational interference, and the power transmission shaft TFS is selectively connected to the output shaft OS by the fourth clutch CL4 used for synchronization.

The planetary gear set PG disposed on the second axis line L2 is a single-pinion planetary gear set, which includes a sun gear S, a planetary carrier PC rotatably supporting a plurality of pinion gears P externally meshing with the sun gear S to allow them to revolve on their own axes and around, and a ring gear R internally meshing with the plurality of pinion gears P and connected to the sun gear S.

The sun gear S is fixedly connected to the power transmission shaft TFS, and the ring gear R is fixedly connected to the output shaft OS through a power transmission member TFM.

The first speed gear row G1 consists of (or includes) a first drive gear D1 fixedly connected integrally onto the first input shaft IS1, and a first driven gear P1 fixedly connected integrally onto the power transmission shaft TFS and externally geared to the first drive gear D1.

In this case, although the fourth clutch CL4 is described as being disposed between the power transmission shaft TFS and the output shaft OS, it may be disposed between the first driven gear P1 and the output shaft OS since the first driven gear P1 is integral with the power transmission shaft TFS.

The second speed gear row G2 consists of (or includes) a second drive gear D2 fixedly connected integrally onto the second input shaft IS2, and a second driven gear P2 fixedly connected integrally onto the power transmission shaft TFS and externally geared to the second drive gear D2.

The third speed gear row G3 consists of (or includes) a third drive gear D3 fixedly connected integrally onto the third input shaft IS3, and a third driven gear P3 fixedly connected integrally onto the planetary carrier PC of the planetary gear set PG and externally geared to the third drive gear D3.

The gear ratio of the drive gears and driven gears of the three speed gears G1, G2, and G3 may change according to the design requirements of the corresponding transmission. In an embodiment of the present invention, the first speed gear row G1 is set to a gear ratio for one speed gear shifting, the second speed gear row G2 is set to a gear ratio for two speed gear shifting, and the third speed gear row G3 is set to a gear ratio for three speed gear shifting.

In the above, the first, second, third clutch CL1, CL2, and CL3 used as coupling elements and the fourth clutch CL4 may be realized as a hydraulic pressure friction device that are frictionally engaged by hydraulic pressure supplied from a hydraulic controller, it should not be understood to be limited thereto. Meanwhile, the coupling element is any of a dog clutch, an electric clutch, and a magnetic particle clutch, the like which may be automatically controlled, and may be adopted.

In FIG. 1, the unexplained reference numeral "DA" refers to a torsional damper that damps torque variations from the engine ENG.

FIG. 2 is a table showing how the power transmission apparatus works according to the first embodiment of the present invention shift gears. The gear shifting process will be described below.

First, in the first embodiment, fixed gears, from one speed forward to five speeds forward, may be implemented in engine mode.

[One Speed Forward]

At one speed forward, the first clutch CL1 and the fourth clutch CL4 are controlled to operate, as shown in FIG. 2.

Then, as the first clutch CL1 operates, the rotating power of the engine ENG is transmitted sequentially through the first clutch CL1, the first input shaft IS1, the first drive gear D1, the first driven gear P1, the power transmission shaft TFS, the fourth clutch CL4, the output shaft OS, and the output gear OG and then to the final reduction gear FSDG in the differential DIFF through the output gear OG. In this way, one speed forward driving is achieved.

In this case, the sun gear S of the planetary gear set PG is connected to the power transmission shaft TFS, and the ring gear R is connected to the output shaft OS through the power transmission member TFM, whereby the same number of input rotations is provided to both sides. Thus, the whole planetary gear set PG revolves as a single integral unit, but does not any effect on gear shifting.

[Two Speeds Forward]

At two speeds forward D2, the second and fourth clutches CL2 and CL4 are controlled to operate, as shown in FIG. 2.

Then, as the second clutch CL2 operates, the rotating power of the engine ENG is transmitted sequentially through the second clutch CL2, the second input shaft IS2, the second drive gear D2, the second driven gear P2, the power transmission shaft TFS, the fourth clutch CL4, the output shaft OS, and the output gear OG and then to the final reduction gear FSDG in the differential DIFF through the output gear OG. In this way, two speed forward driving is achieved.

In this case, the sun gear S of the planetary gear set PG is connected to the power transmission shaft TFS, and the ring gear R is connected to the output shaft OS through the power transmission member TFM, whereby the same number of input rotations is provided to both sides. Thus, the whole planetary gear set PG revolves as a single integral unit, but does not have any effect on gear shifting.

[Three Speeds Forward]

At three speeds forward D3, the third clutch CL3 and the fourth clutch CL4 are controlled to operate, as shown in FIG. 2.

Then, as the third clutch CL3 operates, the rotating power of the engine ENG is transmitted sequentially through the third clutch CL3, the third input shaft IS3, the third drive gear D3, the third driven gear P3 to the planetary carrier PC of the planetary gear set PG.

In this case, the fourth clutch CL4 operates while the sun gear S of the planetary gear set PG is connected to the power transmission shaft TFS and the ring gear R is connected to the output shaft OS through the power transmission member TFM. Thus, the planetary gear set PG revolves as a single integral unit, and the rotating power of the planetary carrier PC is directly transmitted to the output gear OG through the output shaft OS and then to the final reduction gear FSDG in the differential DIFF through the output gear OG. In this way, three speed forward driving is achieved.

[Four Speeds Forward]

At four speeds forward D4, the second clutch CL2 and the third clutch CL3 are controlled to operate, as shown in FIG. 2.

Accordingly, as the second clutch CL2 and the third clutch CL3 operate, the rotating power of the engine ENG is transmitted to the second and third input shafts IS2 and IS3.

In this case, the rotating power transmitted to the second input shaft IS2 is transmitted sequentially through the second drive gear D2, the second driven gear P2, and the power transmission shaft TFT to the sun gear S of the planetary gear set PG, and the rotating power transmitted to the third input shaft IS3 is transmitted to the planetary carrier PC of the planetary gear set PG through the third drive gear D3 and the third driven gear P3.

Then, different numbers of input rotations are provided to the sun gear S and planetary carrier PC of the planetary gear set PG. This difference in the number of rotations invokes a speeding up of the ring gear R, and the rotating power output from the ring gear R is transmitted sequentially through the power transmission member TFM, the output shaft OS, and the output gear OG and then to the final reduction gear FSDG in the differential DIFF through the output gear OG. In this way, four speed forward driving is achieved.

[Five Speeds Forward]

At five speeds forward D5, the first clutch CL1 and the third clutch CL3 are controlled to operate, as shown in FIG. 2.

Accordingly, as the first clutch CL1 and the third clutch CL3 operate, the rotating power of the engine ENG is transmitted to the first and third input shafts IS1 and IS3.

In this case, the rotating power transmitted to the first input shaft IS1 is transmitted sequentially through the first drive gear D1, the first driven gear P1, and the power transmission shaft TFT to the sun gear S of the planetary gear set PG, and the rotating power transmitted to the third input shaft IS3 is transmitted to the planetary carrier PC of the planetary gear set PG through the third drive gear D3 and the third driven gear P3.

Then, different numbers of input rotations are provided to the sun gear S and planetary carrier PC of the planetary gear set PG. In this case, the number of input rotations provided to the sun gear S is smaller than the number of rotations for the four speeds forward, thus invoking a speeding up of the ring gear R faster than four speeds forward, and the rotating power output from the ring gear R is transmitted sequentially through the power transmission member TFM, the output shaft OS, and the output gear OG and then to the final reduction gear FSDG in the differential DIFF through the output gear OG. In this way, five speed forward driving is achieved.

In the fixed gears of five speeds forward as above, torque assist driving using the motor/generator MG is possible as shown in FIG. 2, and therefore parallel hybrid mode driving is achieved.

Moreover, in electric vehicle mode EV, as shown in FIG. 2, the power source is switched from the engine ENG to the motor/generator MG, and the motor/generator MG rotates forward and in reverse while the fourth clutch CL4 operates, thus enabling driving forward EV1 and in reverse REV in electric vehicle mode by the forward/reverse rotation of the motor/generator MG.

In electronic continuously variable transmission mode e-CVT, as shown in FIG. 2, the rotation speed of the engine ENG may be controlled by controlling the number of rotations of the motor/generator MG while the third clutch CL3 is operating. In the e-CVT mode and the EV mode, the engine does not consume fuel to generate torque and the motor alone generate a wheel driving torque.

Figure 3:
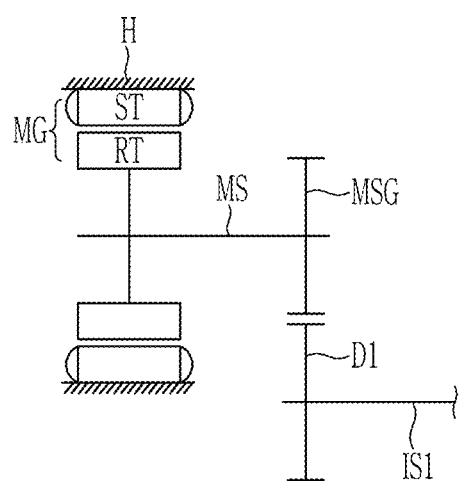
FIG. 3 is a layout view of a motor/generator according to a second embodiment of the present invention.

FIG. 3 is a layout view of a motor/generator according to a second embodiment of the present invention.

Referring to FIG. 3, in the first embodiment, the rotor RT of the motor/generator MG is fixedly connected to the first input shaft IS1, whereas, in the second embodiment, a motor shaft MS to be fixedly connected to the rotor RT of the motor/generator MG is added and a motor shaft gear MSG fixedly connected onto the motor shaft MS is externally geared to the first drive gear D1 on the first input shaft IS1.

In the second embodiment, the same five speed gear shifting process applies except that the direction of rotation of the motor/generator MG is changed due to the addition of the motor shaft MS and motor shaft gear MSG, so a detailed description thereof will be omitted.

Figure 4:
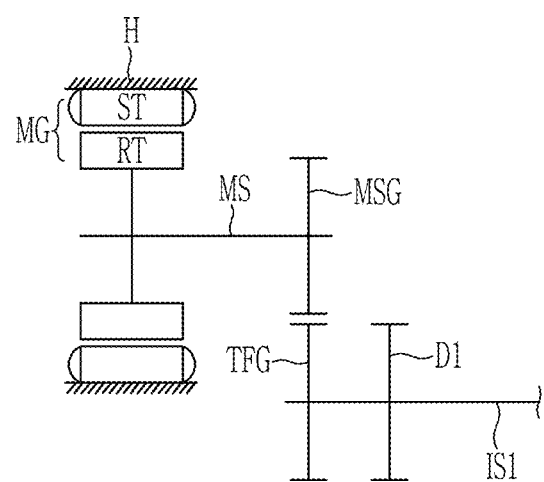
FIG. 4 is a layout view of a motor/generator according to a third embodiment of the present invention.

FIG. 4 is a layout view of a motor/generator according to a third embodiment of the present invention.

Referring to FIG. 4, in the first embodiment, the rotor RT of the motor/generator MG is fixedly connected to the first input shaft IS1, whereas, in the second embodiment, a motor shaft MS to be fixedly connected to the rotor RT of the motor/generator MG is added and a motor shaft gear MSG fixedly connected onto the motor shaft MS is externally geared to a power transmission gear TFG fixedly connected onto the first input shaft IS1.

In the third embodiment, the same five speed gear shifting process applies except that the direction of rotation of the motor/generator MG is changed due to the addition of the motor shaft MS, motor shaft gear MSG, and power transmission gear TFG, so a detailed description thereof will be omitted.

Figure 5:
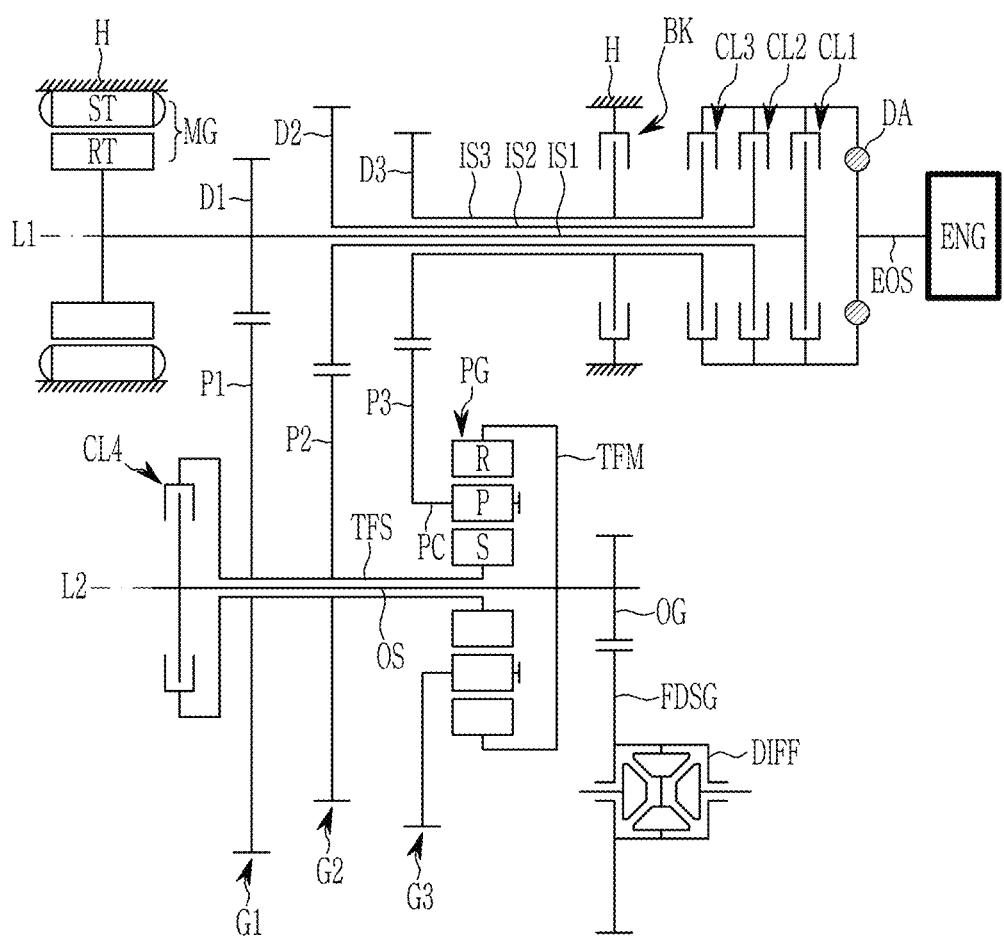
FIG. 5 is a schematic diagram of a power transmission apparatus for a vehicle according to a fourth embodiment of the present invention.

FIG. 5 is a schematic diagram of a power transmission apparatus for a vehicle according to a fourth embodiment of the present invention.

Referring to FIG. 5, the fourth embodiment is different from the first embodiment in that the third input shaft IS3 is selectively connected to the transmission housing H through a brake BK.

That is, the components in the fourth embodiment are identical to those in the first embodiment, except for the addition of the brake BK, so a detailed description will be omitted.

FIG. 6 is a table showing how the power transmission apparatus works according to the fourth embodiment of the present invention shift gears.

Referring to FIG. 6, in the power transmission apparatus according to the fourth embodiment of the present invention, the fixed gears of five speeds forward in engine mode and parallel mode are identical to those in the first embodiment, except that one speed in reverse REV1 and two speeds in reverse REV2 are added.

Also, in electric vehicle mode EV, two speeds forward EV2 and two speeds in reverse EV-REV2 may be added.

Accordingly, a description will be given only of how gear shifting works at one speed and two speeds in reverse REV1 and REV2 of the fixed gears and at two speeds forward and in reverse EV2 and EV-REV2 of electric vehicle mode EV, and a description of the same gear shifting process as in the first embodiment will be omitted.

[One Speed in Reverse]

At one speed in reverse REV1, the first clutch CL1 and the brake BK are controlled to operate, as shown in FIG. 6.

Then, as the first clutch CL1 operates, the rotating power of the engine ENG is inputted sequentially through the first clutch CL1, the first input shaft IS1, the first drive gear D1, the first driven gear P1, and the power transmission shaft TFS to the sun gear S of the planetary gear set PG. In this state, the planetary carrier PC is held fixed by the operation of the brake BK.

Accordingly, the ring gear R rotates in reverse, and the reverse rotation output is transmitted sequentially through the power transmission member TFM, the output shaft OS, and the output gear OG and then to the final reduction gear FSDG in the differential DIFF through the output gear OG. In this way, one speed in reverse driving is achieved.

[Two Speeds in Reverse]

At two speeds in reverse REV2, the second clutch CL2 and the brake BK are controlled to operate, as shown in FIG. 6.

Then, as the second clutch CL1 operates, the rotating power of the engine ENG is inputted sequentially through the second clutch CL2, the second input shaft IS2, the second drive gear D2, the second driven gear P2, and the power transmission shaft TFS to the sun gear S of the planetary gear set PG. In this state, the planetary carrier PC is held fixed by the operation of the brake BK.

Accordingly, the number of input rotations provided to the sun gear S is larger than the number of rotations for the one speed in reverse REV1, thus causing the ring gear R to rotate in reverse with a larger number of rotations, and the reverse rotation output is transmitted sequentially through the power transmission member TFM, the output shaft OS, and the output gear OG and then to the final reduction gear FSDG in the differential DIFF through the output gear OG. In this way, two speed in reverse driving is achieved.

At two speeds forward EV2 and two speeds in reverse EV-REV2 of electric vehicle mode EV, the brake BK is controlled to operate, as shown in FIG. 6.

Then, the rotating power of the forward and reverse rotation of the motor/generator MG is inputted sequentially through the first clutch CL1, the first input shaft IS1, the first drive gear D1, the first driven gear P1, and the power transmission shaft TFS to the sun gear S of the planetary gear set PG. In this state, the planetary carrier PC is held fixed by the operation of the brake BK, thus achieving the two speeds forward EV and two speeds in reverse EV-REV2 of electric vehicle mode EV.

Also, in electronic continuously variable transmission mode e-CVT, the rotation speed of the engine ENG may be controlled by controlling the number of rotations of the motor/generator MG while the third clutch CL3 is operating, as shown in FIG. 6.

As seen from above, a power transmission apparatus according to an embodiment of the present invention can implement fixed gears of five speeds forward, without a synchronizer, by using three speed gears and a planetary gear set. This reduces the number of parts and therefore allows for a simplified internal configuration, makes the overall length as short as possible, and minimizes the weight, thereby improving fuel economy.

Furthermore, a power transmission apparatus according to an embodiment of the present invention enables driving in parallel hybrid mode, forward and reverse driving in electric vehicle mode, and driving in electronic continuously variable transmission mode and therefore improves fuel economy, since torque assist driving using a motor/generator is possible in the fixed gears of five speeds forward by employing three shift gears, a planetary gear set, and the motor/generator, without a synchronizer.

Furthermore, a power transmission apparatus according to an embodiment of the present invention enables engine mode driving and parallel mode driving at five speeds forward and two speeds in reverse so as to improve reverse driving performance by allowing one of three rotational elements in the planetary gear set to be held fixed, and also enables electric vehicle mode driving at two speeds forward and in reverse and electronic continuously variable transmission mode driving, thereby improving fuel economy.

While this invention has been described in connection with embodiments of the invention, it is to be understood that the invention is not limited to the disclosed embodiments, but, on the contrary, is intended to cover various modifications and equivalent arrangements included within the spirit and scope of the appended claims.

What is claimed is:

1. A power transmission apparatus for a vehicle comprising:
- a first input shaft selectively connected to an engine output shaft through a first clutch;
- a second input shaft configured as a hollow shaft that is disposed on the outer circumference of the first input shaft without rotational interference and selectively connected to the engine output shaft through a second clutch;
- a third input shaft configured as a hollow shaft that is disposed on the outer circumference of the second input shaft without rotational interference and selectively connected to the engine output shaft through a third clutch;
- an output shaft placed parallel to the first, second, and third input shafts at a certain distance;
- a power transmission shaft configured as a hollow shaft that is disposed on the outer circumference of the output shaft without rotational interference and selectively connected to the output shaft through a fourth clutch;
- a motor/generator that drives the first input shaft;
- a planetary gear set has three rotational elements, one of which being fixedly connected to the power transmission shaft and another being fixedly connected to the output shaft; and
- three speed gear sets disposed between the first, second, and third input shafts and the power transmission shaft and remaining rotational element of the planetary gear set, with drive gears and driven gears externally gear-meshed to each other.

2. The power transmission apparatus of claim 1, wherein a rotor of the motor/generator is fixedly connected to the first input shaft.

3. The power transmission apparatus of claim 1, wherein the planetary gear set is a single-pinion planetary gear set, which comprises a sun gear fixedly connected to the power transmission shaft, a planetary carrier fixedly connected to one of the driven gears of the three speed gear sets, and a ring gear fixedly connected to the output shaft through a power transmission member.

4. The power transmission apparatus of claim 3,
- wherein the drive gears of the three speed gear sets comprise a first drive gear, a second drive gear and a third drive gear,
- wherein the driven gears of the three speed gear sets comprise a first driven gear, a second driven gear and a third driven gear,
- wherein the three speed gear sets comprise:
  - a first speed gear row comprising the first drive gear fixed to the first input shaft and the first driven gear fixed to the power transmission shaft and externally gear-meshed to the first drive gear;
  - a second speed gear row comprising the second drive gear fixed to the second input shaft and the second driven gear fixed to the power transmission shaft and externally gear-meshed to the second drive gear; and
  - a third speed gear row comprising the third drive gear fixed to the third input shaft and the third driven gear fixed to the planetary carrier of the planetary gear set and externally gear-meshed to the third drive gear.

5. The power transmission apparatus of claim 4, wherein the first speed gear row is set to a gear ratio for one speed gear shifting, the second speed gear row is set to a gear ratio for two speed gear shifting, and the third speed gear row is set to a gear ratio for three speed gear shifting.

6. The power transmission apparatus of claim 1, wherein the motor/generator has a motor shaft, and a motor shaft gear fixed onto the motor shaft is externally gear-meshed to a first one of the drive gears that is fixed to the first input shaft.

7. The power transmission apparatus of claim 1, wherein the motor/generator has a motor shaft, and a motor shaft gear fixed onto the motor shaft is externally gear-meshed to a power transmission gear fixed onto the first input shaft.

8. The power transmission apparatus of claim 1, wherein the third input shaft is selectively connected to a transmission housing through a brake.

* * * * *